(12) United States Patent
Wolfram et al.

(10) Patent No.: US 9,069,814 B2
(45) Date of Patent: Jun. 30, 2015

(54) METHOD AND SYSTEM FOR USING NATURAL LANGUAGE TO GENERATE WIDGETS

(75) Inventors: Stephen Wolfram, Champaign, IL (US); Theodore W. Gray, Champaign, IL (US)

(73) Assignee: WOLFRAM ALPHA LLC, Champaign, IL (US)

( * ) Notice: Subject to any disclaimer, the term of this patent is extended or adjusted under 35 U.S.C. 154(b) by 85 days.

(21) Appl. No.: 13/560,507

(22) Filed: Jul. 27, 2012

(65) Prior Publication Data

US 2013/0031082 A1    Jan. 31, 2013

Related U.S. Application Data

(60) Provisional application No. 61/512,282, filed on Jul. 27, 2011.

(51) Int. Cl.
    *G06F 17/30*      (2006.01)

(52) U.S. Cl.
    CPC .... *G06F 17/30401* (2013.01); *G06F 17/30654* (2013.01); *G06F 17/30964* (2013.01); *G06F 17/30389* (2013.01); *G06F 17/30404* (2013.01);
(Continued)

(58) Field of Classification Search
    CPC ......... G06F 17/00; G06F 17/30; G06F 17/20; G06F 17/21; G06F 17/27; G06F 17/30401; G06F 17/30404; G06F 17/30389; G06F 17/30654; G06F 17/30657; G06F 17/30976; G06F 17/30964

USPC ........ 704/1–3, 9–10; 707/694–695, 705–709, 707/728–731, 758–760, 765–766, 804–805
See application file for complete search history.

(56) References Cited

U.S. PATENT DOCUMENTS

| | | |
|---|---|---|
| 4,734,854 A | 3/1988 | Afshar |
| 4,740,886 A | 4/1988 | Tanifuji et al. |

(Continued)

FOREIGN PATENT DOCUMENTS

| | | |
|---|---|---|
| EP | 0 442 240 A2 | 8/1991 |
| WO | WO-97/40425 A2 | 10/1997 |

(Continued)

OTHER PUBLICATIONS

"AppleScript," Wikipedia.

(Continued)

*Primary Examiner* — Srirama Channavajjala
(74) *Attorney, Agent, or Firm* — Marshall, Gerstein & Borun LLP

(57) ABSTRACT

A user interface application is created to prompt a user for information and to generate a query to be submitted to a natural language (NL) query answering system. A first user is prompted to submit an NL query, and the NL query is received. The user interface application is generated using the NL query and so that the user interface application is configured to prompt the first user or a second user to provide information, receive the information, generate a computer-generated query based on the NL query and the received information, provide the computer-generated query to the NL query answering system, receive answer information from the NL query answering system in response to the computer-generated query, and cause at least some of the answer information to be displayed on a display device.

22 Claims, 11 Drawing Sheets

(52) U.S. Cl.
CPC .... *G06F 17/30657* (2013.01); *G06F 17/30976* (2013.01)

(56) References Cited

U.S. PATENT DOCUMENTS

| | | | |
|---|---|---|---|
| 4,841,441 A | 6/1989 | Nixon et al. | |
| 4,949,253 A | 8/1990 | Chigira et al. | |
| 5,038,296 A | 8/1991 | Sano | |
| 5,315,710 A | 5/1994 | Kishimoto et al. | |
| 5,394,509 A | 2/1995 | Winston | |
| 5,448,740 A | 9/1995 | Kiri et al. | |
| 5,485,601 A | 1/1996 | Ching | |
| 5,499,371 A | 3/1996 | Henninger et al. | |
| 5,555,367 A | 9/1996 | Premerlani et al. | |
| 5,559,939 A | 9/1996 | Wada et al. | |
| 5,634,024 A | 5/1997 | Yamaguchi | |
| 5,640,576 A | 6/1997 | Kobayashi et al. | |
| 5,696,962 A | 12/1997 | Kupiec | |
| 5,768,590 A | 6/1998 | Kimura et al. | |
| 5,815,713 A | 9/1998 | Sanders | |
| 5,815,717 A | 9/1998 | Stack | |
| 5,895,466 A * | 4/1999 | Goldberg et al. | 1/1 |
| 5,987,505 A | 11/1999 | Fry et al. | |
| 6,028,601 A * | 2/2000 | Machiraju et al. | 715/705 |
| 6,038,560 A | 3/2000 | Wical | |
| 6,076,051 A | 6/2000 | Messerly et al. | |
| 6,084,585 A | 7/2000 | Kraft et al. | |
| 6,169,986 B1 | 1/2001 | Bowman et al. | |
| 6,173,441 B1 | 1/2001 | Klein | |
| 6,216,139 B1 | 4/2001 | Listou | |
| 6,256,665 B1 | 7/2001 | Fry et al. | |
| 6,275,976 B1 | 8/2001 | Scandura | |
| 6,289,513 B1 | 9/2001 | Bentwich | |
| 6,446,064 B1 * | 9/2002 | Livowsky | 1/1 |
| 6,493,694 B1 | 12/2002 | Xu et al. | |
| 6,502,236 B1 | 12/2002 | Allen et al. | |
| 6,505,157 B1 | 1/2003 | Elworthy | |
| 6,584,464 B1 | 6/2003 | Warthen | |
| 6,589,290 B1 | 7/2003 | Maxwell et al. | |
| 6,675,159 B1 | 1/2004 | Lin et al. | |
| 6,684,388 B1 | 1/2004 | Gupta et al. | |
| 6,704,728 B1 | 3/2004 | Chang et al. | |
| 6,742,162 B2 | 5/2004 | Bennett | |
| 6,876,314 B1 | 4/2005 | Lin | |
| 6,877,155 B1 | 4/2005 | Lindsey | |
| 6,901,399 B1 | 5/2005 | Corston et al. | |
| 6,973,640 B2 | 12/2005 | Little et al. | |
| 6,996,801 B2 | 2/2006 | Yoneyama | |
| 7,120,574 B2 | 10/2006 | Troyanova et al. | |
| 7,137,100 B2 | 11/2006 | Iborra et al. | |
| 7,197,739 B2 | 3/2007 | Preston et al. | |
| 7,222,333 B1 | 5/2007 | Mor et al. | |
| 7,263,517 B2 | 8/2007 | Sheu et al. | |
| 7,269,822 B2 | 9/2007 | Gebhart et al. | |
| 7,373,291 B2 | 5/2008 | Garst | |
| 7,440,968 B1 | 10/2008 | Oztekin et al. | |
| 7,451,135 B2 | 11/2008 | Goldman et al. | |
| 7,454,701 B2 | 11/2008 | Graeber | |
| 7,613,676 B2 | 11/2009 | Baisley et al. | |
| 7,620,935 B2 | 11/2009 | Baisley et al. | |
| 7,685,507 B2 | 3/2010 | Workman et al. | |
| 7,747,601 B2 | 6/2010 | Cooper et al. | |
| 7,844,594 B1 | 11/2010 | Holt et al. | |
| 8,091,024 B2 | 1/2012 | Graeber | |
| 8,135,696 B2 | 3/2012 | Safoutin | |
| 8,601,015 B1 * | 12/2013 | Wolfram et al. | 707/759 |
| 2002/0099743 A1 | 7/2002 | Workman et al. | |
| 2002/0116176 A1 | 8/2002 | Tsourikov et al. | |
| 2002/0140734 A1 | 10/2002 | Bennett | |
| 2002/0143810 A1 | 10/2002 | Bennett | |
| 2002/0174120 A1 | 11/2002 | Zhang et al. | |
| 2003/0078766 A1 * | 4/2003 | Appelt et al. | 704/9 |
| 2003/0145022 A1 | 7/2003 | Dingley | |
| 2003/0191765 A1 | 10/2003 | Bargh et al. | |
| 2004/0001109 A1 | 1/2004 | Blancett et al. | |
| 2004/0049499 A1 | 3/2004 | Nomoto et al. | |
| 2004/0064323 A1 * | 4/2004 | Kemper et al. | 704/277 |
| 2004/0088158 A1 | 5/2004 | Sheu et al. | |
| 2004/0103405 A1 | 5/2004 | Vargas | |
| 2004/0128649 A1 | 7/2004 | Grundy et al. | |
| 2005/0005258 A1 | 1/2005 | Bhogal et al. | |
| 2005/0080780 A1 | 4/2005 | Colledge et al. | |
| 2005/0097464 A1 | 5/2005 | Graeber | |
| 2006/0020886 A1 | 1/2006 | Agrawal et al. | |
| 2006/0025987 A1 | 2/2006 | Baisley et al. | |
| 2006/0026576 A1 | 2/2006 | Baisley et al. | |
| 2006/0136411 A1 | 6/2006 | Meyerzon et al. | |
| 2006/0206463 A1 * | 9/2006 | Takachio et al. | 707/3 |
| 2006/0271908 A1 | 11/2006 | Bargh et al. | |
| 2006/0279799 A1 | 12/2006 | Goldman | |
| 2007/0022109 A1 | 1/2007 | Imielinski et al. | |
| 2007/0043574 A1 | 2/2007 | Coffman et al. | |
| 2007/0106657 A1 | 5/2007 | Brzeski et al. | |
| 2007/0130134 A1 * | 6/2007 | Ramsey et al. | 707/4 |
| 2007/0136246 A1 * | 6/2007 | Stenchikova et al. | 707/3 |
| 2007/0156747 A1 * | 7/2007 | Samuelson | 707/102 |
| 2007/0168335 A1 * | 7/2007 | Moore et al. | 707/3 |
| 2007/0203929 A1 | 8/2007 | Bolivar | |
| 2007/0208722 A1 | 9/2007 | Dettinger et al. | |
| 2007/0209013 A1 * | 9/2007 | Ramsey et al. | 715/769 |
| 2007/0220034 A1 | 9/2007 | Iyer et al. | |
| 2008/0016040 A1 | 1/2008 | Jones et al. | |
| 2008/0066052 A1 | 3/2008 | Wolfram | |
| 2009/0055733 A1 | 2/2009 | Graeber | |
| 2009/0089282 A1 * | 4/2009 | Qi et al. | 707/5 |
| 2009/0132506 A1 * | 5/2009 | Houck et al. | 707/4 |
| 2009/0171923 A1 | 7/2009 | Nash et al. | |
| 2010/0004924 A1 | 1/2010 | Paez | |
| 2010/0293174 A1 | 11/2010 | Bennett et al. | |

FOREIGN PATENT DOCUMENTS

| | | |
|---|---|---|
| WO | WO-2006/014892 A2 | 2/2006 |
| WO | WO-2006/015006 A2 | 2/2006 |

OTHER PUBLICATIONS

"Area calculator", http://www.calculator.com, 1 page, Aug. 15, 2006.
"calculator.com", http://www.calculator.com, 2 pages, Aug. 15, 2006.
"Car Lease Calculator", http://www.calculator.com, 1 page, Aug. 15, 2006.
"Currency Calculator", http://www.calculator.com, 1 page, Aug. 15, 2006.
"Fractions calculator", http://www.calculator.com, 1 page, Aug. 15, 2006.
"General Loan Calculator", http://www.calculator.com, 1 page, Aug. 15, 2006.
"Google Code," http://code.google.com/ , Mar. 17, 2005, p. 1-11.
"Graphing calculator", http://www.calculator.com, 1 page, Aug. 15, 2006.
"Home—Finance", http://www.calculator.com, 2 pages, Aug. 15, 2006.
"Home Equity Calculator", http://www.calculator.com, 1 page, Aug. 15, 2006.
"How Much Can I Afford Calculator", http://www.calculator.com, 1 page, Aug. 15, 2006.
"Length Adding Calculator", http://www.calculator.com, 1 page, Aug. 15, 2006.
"Love Calculator", http://www.calculator.com, 1 page, Aug. 15, 2006.
"Mortgage Payment Calculator", http://www.calculator.com, 1 page, Aug. 15, 2006.
"Mortgage Qualification Calculator", http://www.calculator.com, 1 page, Aug. 15, 2006.
"Percent calculator", http://www.calculator.com, 1 page, Aug. 15, 2006.
"Rent versus Buy Calculator", http://www.calculator.com, 1 page, Aug. 15, 2006.
"Scientific calculator", http://www.calculator.com, 1 page, Aug. 15, 2006.

(56) References Cited

OTHER PUBLICATIONS

"Standard calculator", http://www.calculator.com, 1 page, Aug. 15, 2006.
"Temperature calculator", http://www.calculator.com 1 page, Aug. 15, 2006.
"The Mortgage Calculator," http://www.hughchou.org/calc/mortold.html, Aug. 8, 1996, p. 1-7.
"Time Calculator", http://www.calculator.com 1 page, Aug. 15, 2006.
"Unit Conversion Calculator", http://www.calculator.com 1 page, Aug. 15, 2006.
Adorni, et al., "Natural Language Input for Scene Generation," Proceedings of the first conference on European Chapter of the Association for Computational Linguistics, pp. 175-182 (1983).
Asperti et al., "A content based mathematical search engine: Whelp," 2004, p. 1-15.
Estival et al., "Towards Ontology-Based Natural Language Processing," http://acl.ldc.upenn.edu/acl2004/nlpxml/pdf/estival-etal.pdf, accessed Mar. 8, 2010, 8 pages.
Kamareddine et al., "Restoring Natural Language as a Computerized Mathematics Input Method," Proceedings of the 14th symposium on Towards Mechanized +Mathematical Assistants: 6th International Conference, pp. 280-295 (2007).
Ko et al., "The State of the Art in End-User Software Engineering," accepted for publication in ACM Computing Surveys.
Lavrov, "Program Synthesis," Cybernetics and Systems Analysis, vol. 18, No. 6 pp. 708-715 (Nov. 1982).
Meyers, A., "VOX—An Extensible Natural Language Processor," http://dli.iiit.ac.in/ijcai/IJCAI-85-VOL2/PDF/026.pdf, accessed Mar. 8, 2010, 5 pages.
Moore, Gregory M., "Calculator Code: Programming Code for Use within a Scientific Calculator," Fall 2005, p. 1-29.
Myers et al., "Natural Programming Languages and Environments," Communications of the ACM, vol. 47, No. 9, pp. 47-52 (Sep. 2004).
Office Action for related U.S. Appl. No. 12/780,685, dated Feb. 15, 2012.
Office Action for related U.S. Appl. No. 12/780,705, dated Jan. 31, 2012.
Osogami, "A Study of Input and Output Conditions for Automatic Program Generation," Memoirs of the Fukui Institute of Technology, vol. 37 pp. 273-278 (2007).
Sucan, Ioan Alexandru, "A Search Engine for Mathematical Formulae," May 7, 2006, p. 1-17.
Trott, Michael, "Mathematical Searching of the Wolfram Functions Site," 2005, The Mathematica Journal, p. 713-726.
Trott, Michael, "The Functions Website," 2003, The Mathematica Journal, p. 1-10.
Wang et al., "Mining Term Association Patterns from Search Logs for Effective Query Reformulation," ACM CIKM 2008, Oct. 26-30, 2008, pp. 479-488.

* cited by examiner

Fig. 7A                    ← 530

Query Template Editor
_____
                                                          ⌐ 538
distance from chicago to los angeles          ┌─────────────┐
                                               │ + New Variable│
                        ← 534                  └─────────────┘

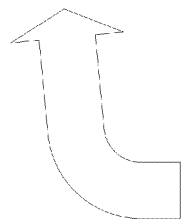

𝓗𝒾𝑔𝒽𝓁𝒾𝑔𝒽𝓉 elements and
         click "New variable"         ⌐ 564    ⌐ 560
                                      ┌────┐ ┌────┐
                                      │◄Back│ │Next►│
                                      └────┘ └────┘

Fig. 7B                    ← 530

Query Template Editor
_____
                                                          ⌐ 538
distance from [//city:${input1}//] to los angeles ┌─────────────┐
                                                   │ + New Variable│
                        ← 534                      └─────────────┘
_____

Variable   Displayed   Default   Component   Interpretation
Name       label       Value     type
[input 1]  [Distance from] [Chicago] [Input Field ▼] [City ▼]  [x]
544a ⌐     546a ⌐      548a ⌐    550a ⌐              552a ⌐    556a ⌐

⌐ 564    ⌐ 560
         542 ◄                        ┌────┐ ┌────┐
                                      │◄Back│ │Next►│
                                      └────┘ └────┘

Query Template Editor distance from [//city:${input1}//] to [//city:${input2}//]
← 534

+ New Variable  ← 538

| Variable Name | Displayed label | Default Value | Component type | Interpretation | |
|---|---|---|---|---|---|
| input 1 | Distance from | Chicago | Input Field ▼ | City ▼ | [x] |
| 544a | 546a | 548a | 550a | 552a | 556a |
| input 2 | to | weight | Input Field ▼ | City ▼ | [x] |
| 544b | 546b | 548b | 550b | 552b | 556b |

542

◀ Back  564
Next ▶  560

Widget Output:

*Choose output setting*

Distance
Distance from [chicago]
to [los angeles]
[Submit]

WolframAlpha

☐ Show Assumptions
☐ Show Warnings

Input interpretation:

| distance | from | Chicago, Illinois |
| | to | Los Angeles, California |

Result:

1752 miles

Unit conversions:
2820 kilometers
2.82 x 10⁶ meters

← 660

664
668

Widget Output Settings ▼
                                    Back

▦ Include all output

▌ Include only specific output

▦ Exclude specific output

Preview

*Try out your widget!*

Distance
Distance from [chicago]
to [los angeles]
[Submit]

— 716
— 700
— 704
— 700

Output Types

Choose the type of display for your widget — 708

○ Lightbox — 712a
Displayed on top of page content

○ Popup — 712b
Displayed in a new browser window

○ Inline — 712c
Display in an iframe on your page

Initial configuration:
☒ Widget controls displayed
☐ Widget results displayed

Note: All types require JavaScript to be turned on in the user's browser.

Output Settings — 720

Width:      Height:
[575] px   [450] px

Fig. 10

METHOD AND SYSTEM FOR USING NATURAL LANGUAGE TO GENERATE WIDGETS

CROSS-REFERENCE TO RELATED APPLICATION

This application claims the benefit of U.S. Provisional Patent Application No. 61/512,282 entitled "Method and System for Using Natural Language to Generate Widgets," filed on Jul. 27, 2011, the entire disclosure of which is hereby incorporated by reference herein.

BACKGROUND

The wide spread availability of networked communication and information storage has brought many changes to the world. Much more information is stored and is easily available. However, the information, while useful, may not necessarily provide answers users seek. Often, the information may be related to the desired answer but may not provide the actual answer. Similarly, the answer is often included in the information but difficult to find.

Search engines, such as Internet search engines, have been in use for some time. Such search engines permit the user to form a search query using combinations of keywords to search through a web page database containing text indices associated with one or more distinct web pages. The search engine looks for matches between the search query and text indices in the web page database, and then returns a number of hits which correspond to URL pointers and text excerpts from the web pages that represent the closest matches.

Some Internet search engines analyze the context of terms in order to narrow the number of matches. For example, if a search query includes the words "yellow" and "pages," a search engine may recognize that the phrase "yellow pages" has a particular meaning and it may therefore note that web pages including the phrase "yellow pages" may be a closer match than web pages merely containing the word "yellow" and/or the word "pages."

Some application programs, for example, a word processor, may have a help tool that allows a user to enter a word or phrase and will display help topics containing that word or phrase, from which the user can make a selection.

SUMMARY

According to an embodiment, a method for creating a user interface application to prompt a user for information and to generate a query to be submitted to a natural language (NL) query answering system is provided. The method includes prompting, using one or more computing devices, a first user to submit an NL query, and receiving the NL query. The method also includes generating, using one or more computing devices, the user interface application using the NL query. The user interface application is generated so that the user interface application is configured to prompt the first user or a second user to provide information, receive the information, generate a computer-generated query based on the NL query and the received information, provide the computer-generated query to the NL query answering system, receive answer information from the NL query answering system in response to the computer-generated query, and cause at least some of the answer information to be displayed on a display device. In another embodiment, a system comprising one or more computing devices is configured to implement the method.

In another embodiment, a method for retrieving answer information from a natural language (NL) query answering system is provided. The method includes prompting, using one or more computing devices, a user to provide information regarding a query, and determining one or more respective values of one or more variables using the received information. The method additionally includes generating a computer-generated query that is based on an NL query, wherein the computer-generated query is generated to include the one or more respective values of the one or more variables, and providing the computer-generated query to the NL query answering system. Also, the method includes receiving, from the NL query answering system, answer information responsive to the computer-generated query, and causing the answer information to be displayed on a display device. In another embodiment, a system comprising one or more computing devices is configured to implement the method.

BRIEF DESCRIPTION OF THE DRAWINGS

FIGS. 7A-7C are illustrations of a user interface for using an NL query to generate a widget, according to an embodiment;

FIG. 9 is an illustration of a user interface for configuring the output to be displayed by a widget, according to an embodiment;

FIG. 10 is an illustration of a user interface for configuring how output will be displayed by a widget, according to an embodiment.

DETAILED DESCRIPTION

Figure 1:
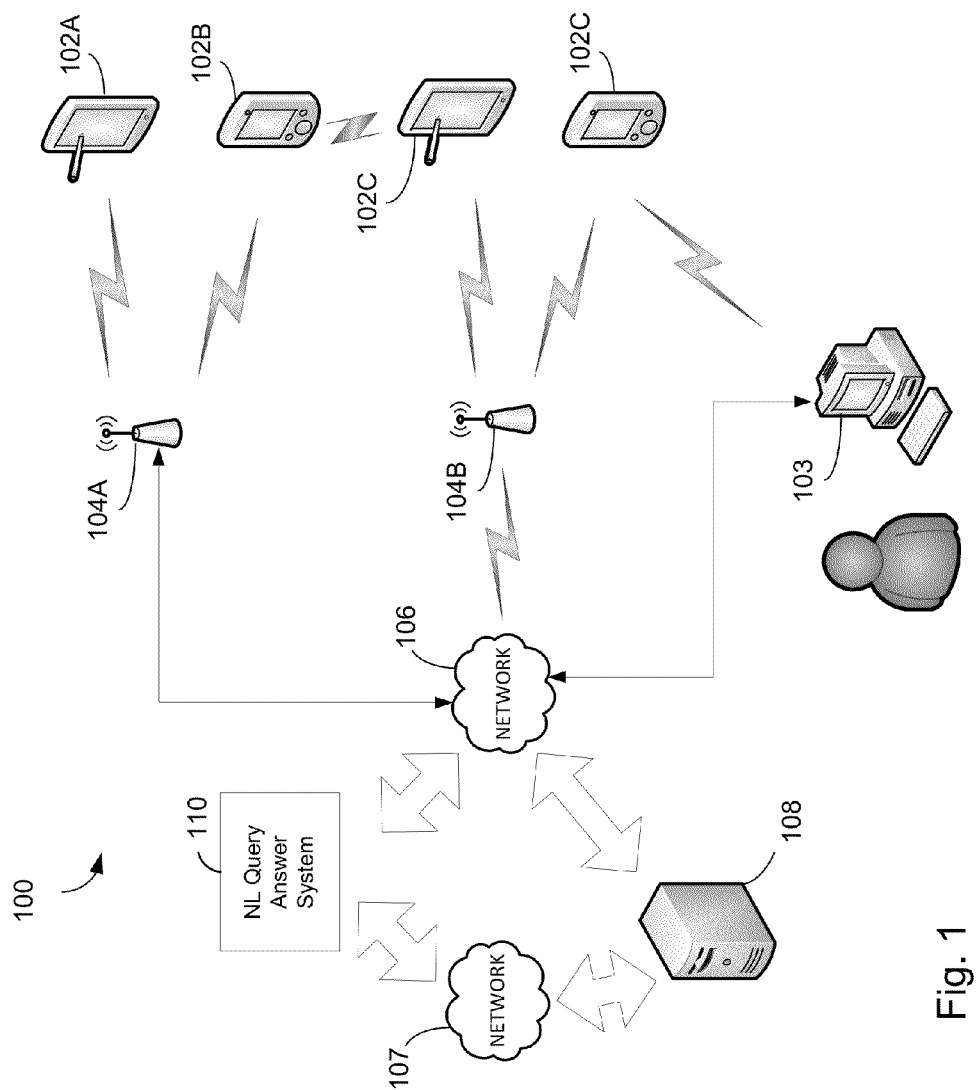
FIG. 1 is an illustration of an example system in which widgets are created and utilized, according to an embodiment.

FIG. 1 depicts an embodiment of an exemplary system 100 that utilizes widgets that interface with a natural language (NL) query answering system to provide answers to user queries. A widget is a software application. In some embodiments, the widget can be installed and executed within a web page. As discussed below, an end user in the system 100 can create a widget and include the widget in a web page, for example.

The system 100 may include a plurality of mobile, multi-function computers 102, which may include mobile phones, smart phones, tablet computers, portable computers (e.g., laptop and netbook computers), personal digital assistants (PDAs), portable media players (PMPs), and the like. Throughout this specification, the term "mobile device" will be used to refer to any of these mobile, multi-function computers 102. The mobile devices 102 are generally characterized by: a general purpose microprocessor (i.e., one that can be programmed to perform different functions at different times, according to the desires of the user); a memory device and/or system, storing an operating system and a plurality of applications; a display; and an input mechanism, such as a keyboard, one or more buttons, a microphone and a voice recognition system, a touch screen, etc.

The system 100 may also include a plurality of desktop computers 103, which may include PCs, workstations, and the like. Throughout this specification, the term "desktop device" will be used to refer to any of these desktop computers 103. The desktop devices 103 are generally characterized by: a general purpose microprocessor (i.e., one that can be programmed to perform different functions at different times, according to the desires of the user); a memory device and/or system, storing an operating system and a plurality of applications; a display; and an input mechanism, such as a keyboard, one or more buttons, a microphone and a voice recognition system, a touch screen, etc.

In the embodiment depicted in FIG. 1, the system 100 also includes a plurality of wireless routers or access points 104, which may allow the mobile devices 102 (and in some scenarios, the desktop devices 103) to communicate with others of the mobile devices 102, with a communication network 106, with a server 108, and/or with a desktop device 103.

The system also includes an NL query answering system 110 communicatively coupled to the network 106. In an embodiment, the NL query answering system 110 processes natural language (NL) queries and generates answers (and, in some embodiments, information related to the answers) in response to the NL queries. In an embodiment, the NL query answering system 110 comprises a system the same as or similar to the systems described in U.S. patent application Ser. No. 11/852,044, filed on Sep. 7, 2007, and/or in U.S. patent application Ser. No. 12/780,685, filed on May 14, 2010, which are hereby incorporated by reference herein in their entireties.

In an embodiment, the server 108 implements a widget generation application that permits users, via mobile devices 102 and/or desktop devices 103, to generate widgets for interfacing with the NL query answer system 110. In some embodiments, a user downloads or retrieves a generated widget from the server 108. In other embodiments, the server 108 generates a web page that includes the widget, and the user, and others, may access the widget via the web page.

The server 108 may communicate with the NL query answering system 100 via the network 106 or via a separate network. Although in FIG. 1 the server 108 is illustrated as separate from the NL query answering system 110, in another embodiment, the server 108 is included in the NL query answering system 110.

As FIG. 1 illustrates, communication between the devices 102, 103 and the server 108 may, in various embodiments, occur via the network 106. Similarly, the server 108 may communicate with the NL query answering system 110 via the network 106, in some embodiments. The communication network 106 may be a proprietary network, a secure public Internet, a virtual private network or some other type of network, such as dedicated access lines, plain ordinary telephone lines, satellite links, combinations of these, etc. Where the network 106 comprises the Internet, data communication may take place over the network 106 via an Internet communication protocol. The communication network 106 may comprise a local area network (LAN), a wide area network (WAN), a metropolitan area network (MAN), etc.

In some embodiments, the server 108 may communicate with the NL query answering system 110 via a communication network 107 separate from the network 106. The communication network 107 may comprise a LAN, a WAN, a MAN, a proprietary network, a virtual private network or some other type of network, such as dedicated access lines, plain ordinary telephone lines, satellite links, combinations of these, etc. In other embodiments, the NL query answering system 110 may include the server 108.

As described in the following paragraphs, the system 100 may include a widget generation application executable on the server 108 (and/or at least partially on the mobile devices 102 and/or the desktop devices 103). The widget generation application, when executed by the server 108 (and/or at least partially by the mobile devices 102 and/or the desktop devices 103), generates widgets that can be used to submit queries to and receive answer information from the NL query answering system 110. In embodiments in which the widget generation application operates at least partially on the remote server 108, the server 108 may generate display instructions that are served to the remote computing devices 102, 103 over the network 106.

Figure 2:
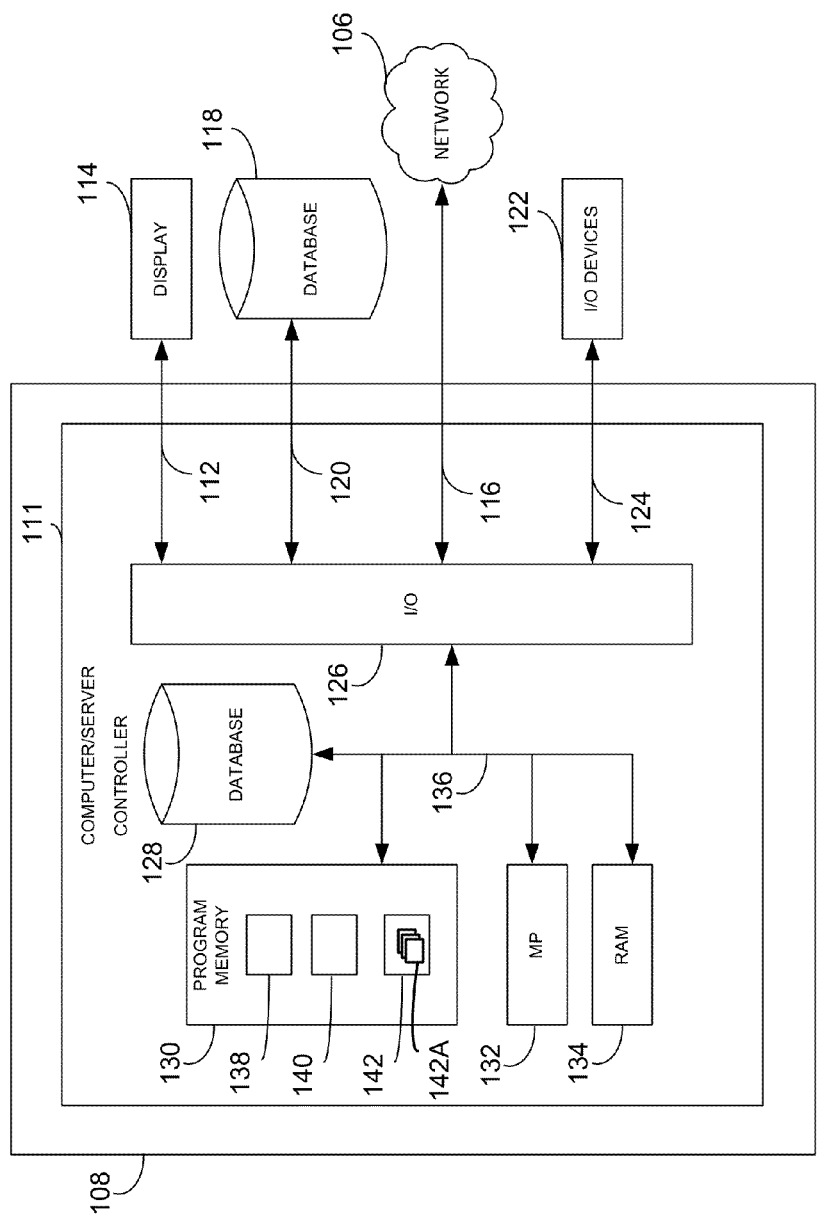
FIG. 2 is a block diagram of a server utilized in the system of FIG. 1, according to an embodiment.

FIG. 2 depicts a block diagram of one possible embodiment of the server 108. The server 108 may have a controller 111 communicatively connected by a video link 112 to a display 114, by a network link 116 (i.e., an Ethernet or other network protocol) to the network 106, to a database 118 via a link 120, and to various other I/O devices 122 (e.g., keyboards, scanners, printers, etc.) by appropriate links 124. The links 112, 116, 120, and links 124 are each coupled to the server 108 via an input/output (I/O) circuit 126 on the controller 111. It should be noted that additional databases, such as a database 128 in the server 108 or other databases (not shown) may also be linked to the controller 111 in a known manner.

The controller 111 includes a program memory 130, a processor 132 (may be called a microcontroller or a microprocessor), a random-access memory (RAM) 134, and the input/output (I/O) circuit 126, all of which are interconnected via an address/data bus 136. It should be appreciated that although only one microprocessor 132 is shown, the controller 111 may include multiple microprocessors 132. Similarly, the memory of the controller 111 may include multiple RAMs 134 and multiple program memories 130. Although the I/O circuit 126 is shown as a single block, it should be appreciated that the I/O circuit 126 may include a number of different types of I/O circuits. The RAM(s) 134 and the program memories 130 may be implemented as semiconductor memories, magnetically readable memories, and/or optically readable memories, for example.

Figure 3:
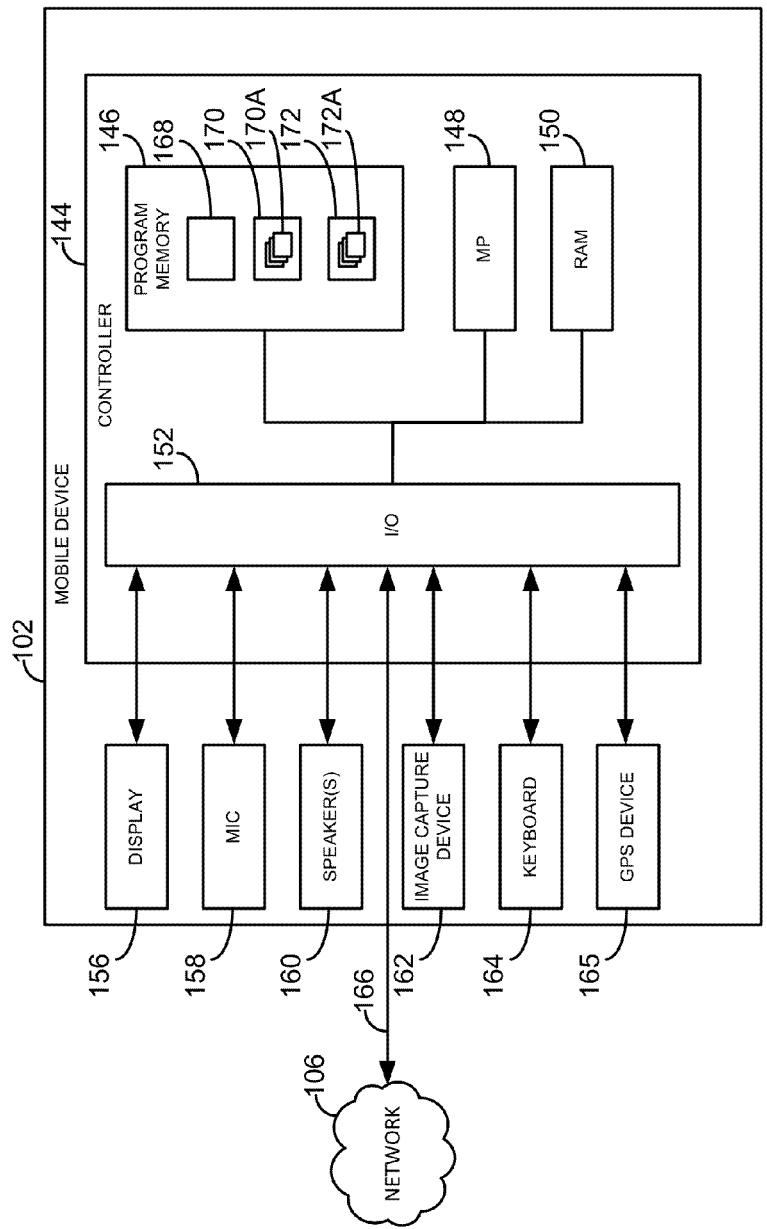
FIG. 3 is a block diagram of a mobile device utilized in the system of FIG. 1, according to an embodiment.

A block diagram of an exemplary embodiment of one of the mobile devices 102 is depicted in FIG. 3. Like the server 108, the mobile device 102 includes a controller 144. The controller 144 includes a program memory 146, a processor 148 (may be called a microcontroller or a microprocessor), a random-access memory (RAM) 150, and an input/output (I/O) circuit 152, all of which are interconnected via an address/data bus 154. It should be appreciated that although only one microprocessor 148 is shown, the controller 144 may include multiple microprocessors 148. Similarly, the memory of the controller 144 may include multiple RAMs 150 and multiple program memories 146. Although the I/O circuit 152 is shown as a single block, it should be appreciated that the I/O circuit 152 may include a number of different types of I/O circuits. The RAM(s) 150 and the program memories 146 may be implemented as semiconductor memories, magnetically readable memories, and/or optically readable memories, for example.

The I/O circuit 152 may communicatively connect the other devices on the controller 144 to one or more other hardware devices in the mobile device 102. For example, the mobile device 102 includes an integrated display 156, which may be a touch sensitive display, a microphone 158, one or more speakers 160, an image capture device 162, a keyboard 164, and/or a geolocation device 165 (e.g., a global positioning system (GPS) receiver). If included, each of the microphone 158, the speakers 160, the image capture device 162, the keyboard 164, and the geolocation device 165 may be integrated in the mobile device 102 (e.g., in a mobile phone or a tablet computer), or may be a peripheral component. Additionally, the various components in the mobile device 102 may be integrated on a single printed circuit board (PCB) (not shown) and/or may be mounted within a single housing (not shown). Further, each of the other devices may operate individually such that the other devices may be turned on or off depending on the need to conserve battery life of the mobile device.

The I/O circuit 152 may also communicatively connect the controller 144 to the network 106, via a connection 166, which may be wireless (e.g., IEEE 802.11) or wireline (e.g., Ethernet) connections. In some embodiments, a chipset on or attached to the I/O circuit 152 may implement communication between the controller 144 and the network 106, while in other embodiments, an Ethernet device (not shown) and/or wireless network card (not shown) may comprise separate devices connected to the I/O circuit 152 via the address/data bus 154.

Either or both of the program memories 130 (FIG. 2) and 146 (FIG. 3) may contain machine-readable instructions (i.e., software) 138-142 (FIG. 2) and 168-172 (FIG. 3) for execution within the processors 132 (FIG. 2) and 148 (FIG. 3), respectively. The software 138-142 and 168-172 may perform the various tasks associated with operation of the server 108 and the mobile device 102, respectively, and may be a single module or a plurality of modules. While the software 138-142 and 168-172 is depicted in FIGS. 2 and 3 as including three modules each, the software 138-142 and 168-172 may include any number of modules accomplishing tasks related to operation of the system 100. For example, the software 138-142 depicted in FIG. 2 includes an operating system 138, server applications 140, and a widget generation application 142, each of which may be loaded into the RAM 134 and/or executed by the microprocessor 132. Similarly, the software 168-172 includes an operating system 168, and one or more applications 170, including a web browser application, for example.

The widget generation application 142 may include one or more modules or routines 142A Likewise, each of the applications 170, 172 may include one or more routines or modules 170A. In addition, the software may be stored on computer storage devices such as compact disks, DVDs, flash memory devices, magnetic hard drives, other optical drives or other storage media.

In some embodiments, some portion or all of the widget generation application 142 may be included at a client device, such as the devices 102, 103 of FIG. 1. On the other hand, as described above, some portion or all of the widget generation application 142 may be included at a centrally available device or group of devices, such as the server 108, a group of networked computing devices, a peer-to-peer network, a cloud computing network, or other centrally available device or group of devices. In other embodiments, a portion of the widget generation application 142 in the device 102 or 103 and a portion of the widget generation application 142 included in the server 108 (or other device) operate cooperatively to generate answer providing widgets.

Figure 4:
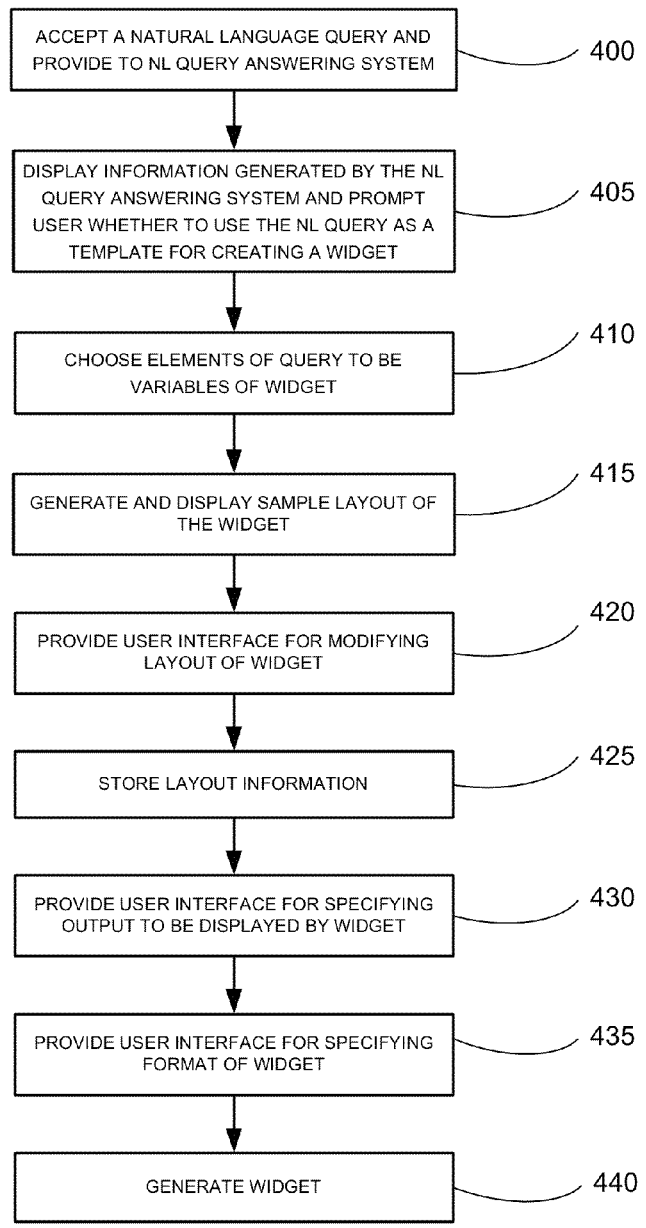
FIG. 4 is application flow diagram of an example method for creating a widget, according to an embodiment.

FIG. 4 illustrates one embodiment of the many embodiments of a method to create a user interface to provide a structured interface for submitting queries to an NL query answering system. Many common search engines merely provide links to other web pages. It is up to the user to search the additional pages to find the desired answer. For example, the distance from Earth to Venus is known but is not widely memorized. A traditional search engine may link to a university web page that includes terms from the query but may or may not provide the desired answer.

In addition, a traditional search engine at the core may be structured to break searches into traditional key word searches which require users to think in a key word manner, rather than ask questions. For example, the question of "What is the distance from Earth to Venus" may be effectively searched as "distance Earth Venus" which may provide a link to a web page that includes the distance from Earth to Venus or may provide a link to a web page that includes the distance from the sun to Venus and the distance from the sun to Earth as the key words (distance Earth Venus) are still present.

In contrast, an NL query answering system may take in questions in natural language (as opposed to key word searches) and respond with answers (rather than links to additional pages). Wolfram|Alpha available at the internet address www.WolframAlpha.com may be one such example of an NL query answering system. As an example, the NL query answering system may receive the question "What is the distance from Earth to Venus" and may respond with an answer in a variety of useful formats.

The present application describes embodiments for creating personalized mini-applications that leverage the depth and breadth of an NL query answering system, such as the Wolfram|Alpha computational knowledge engine, to obtain a tremendous variety of information, from the calories in a recipe to answers to complex mathematical problems. If the computational knowledge engine can answer a query, a widget may be created and instantly offer live computational knowledge and results to web sites, for example. The widgets may be stored, edited, expanded, reduced, communicated, and shared in a variety of different and useful ways.

FIG. 4 illustrates one possible method of creating a user interface application (i.e., a widget) to submit queries to an NL query answering system. FIGS. 5-10 illustrate example displays utilized for creating a widget and that may be utilized with the method of FIG. 4, in an embodiment, and FIG. 4 is described with reference to FIGS. 5-10 for ease of explanation. The method of FIG. 4, however, may be implemented using displays other than the example displays of FIGS. 5-10. Similarly, the displays of FIGS. 5-10 may be utilized with methods other than the method of FIG. 4. The method of FIG. 4 may be implemented by the widget generation application, for example, and the displays of FIGS. 5-10 may be generated by the widget generation application, in an embodiment. For example, the displays of FIGS. 5-10 may be web pages, windows, etc., generated by the widget generation application and transmitted by the server 108 to user devices 102, 103 via the network 106 (see FIG. 1).

Similarly, the method of FIG. 4 is explained with reference to FIG. 1 for ease of explanation, but the method of FIG. 4 may be implemented using suitable systems other than the system of FIG. 1.

At block 400, a natural language input to an answer application may be accepted. As explained earlier, an NL query answering system may accept a question and attempt to respond with an answer. The answer may be calculated, be determined or may be known. The source and steps to obtain the answer also may be illustrated. The NL input may be entered by a user using a device 102, 103, and the NL input may be transmitted to the server 108 via the network 106.

Figure 5:
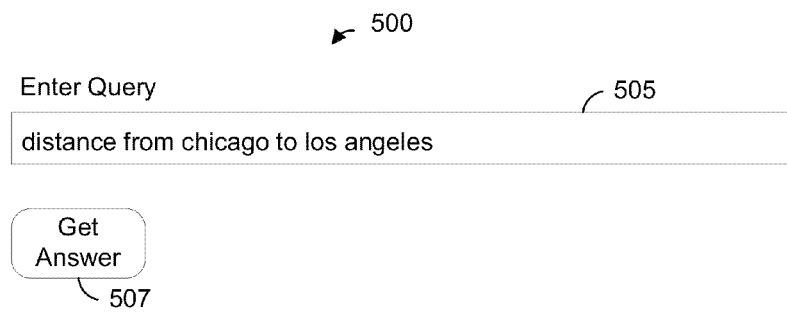
FIG. 5 is an illustration of a user interface to enter a natural language (NL) query in connection with creating a widget, according to an embodiment.

FIG. 5 is an illustration of an example display 500 that may be utilized by a user to input an NL query. The display 500 may be displayed on a display device of a device 102, 102. The display 500 includes a user interface mechanism 505 via which a user may input an NL query. The user interface mechanism 505 may be a text input box and/or any other suitable user interface mechanism. A user may initiate the sending of the NL query to the NL query answering system by activating a button 507 on the display 500, pressing an Enter key on a keyboard or keypad, pressing a button on a computing device, etc., for example. A separate pop up window (not shown) may appear with an analysis of the query (as will be described with respect to blocks 405-415 of FIG. 4) or may indicate that there is a problem with the query and that a new query should be entered. As discussed below, the analysis may be performed by NL query answering system, for example, and the query entered in input area 505 is provided to the NL query answering system. Results of the analysis by the NL query answering system may be provided to the widget generation application, as will be discussed below.

At block 405, assuming the NL query answering system is able to interpret the NL query, an answer to the query is displayed to the user and the user is prompted whether to use the NL query as a template for creating a widget. For example, the NL query may be provided to the NL query answering system 110 by the server 108 or the device 102, 103, via the network 106 or the network 107. Then, the NL query answering system 110 analyzes the query and generates answer information. The answer information may be provided to the server 108 from the NL query answering system 110 via the network 106 or the network 107, and the server 108 may provide the answer information to the device 102, 103 via the network 106. As another example, the answer information may be provided to the device 102, 103 from the NL query answering system 110 via the network 106.

Figure 6:
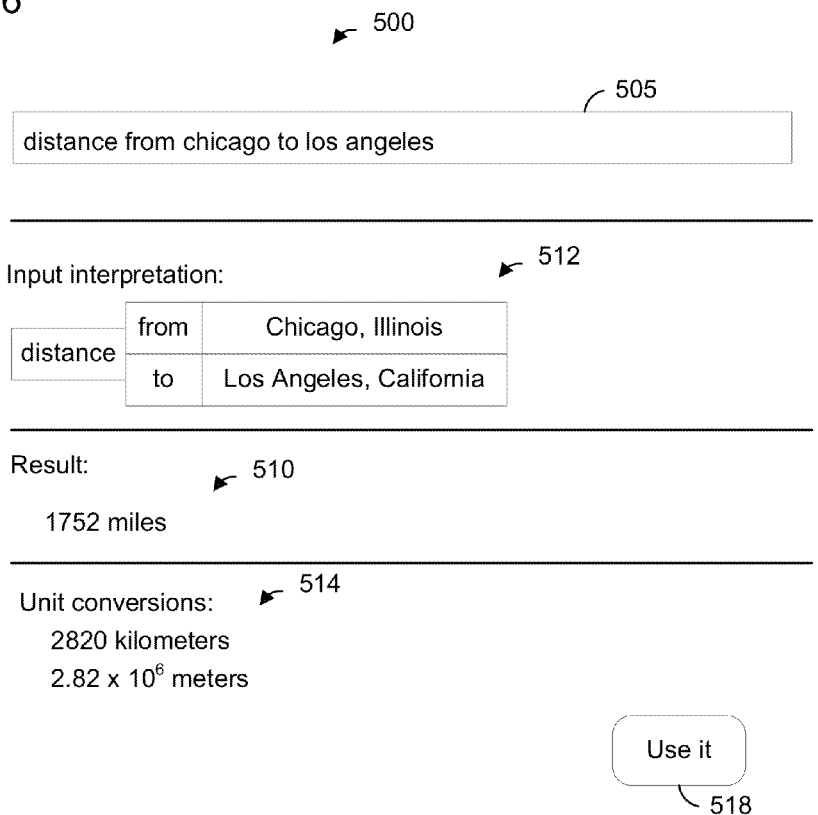
FIG. 6 is an illustration of a user interface to view an answer generated in response to the query entered in FIG. 5, according to an embodiment.

Referring to FIG. 6, the display 500 is modified to include an answer 510 to the query. The answer 510 is generated by the NL query answering system and provided to the widget generation application for display in the display 500. The display 500 may also include information 512 regarding how the NL query was interpreted by the NL query answering system. Additionally, the display 500 may include other information related to the answer. Examples of information generated by the NL query answering system in response to a query and that can be displayed to the user are described in U.S. patent application Ser. No. 11/852,044, filed on Sep. 7, 2007, U.S. patent application Ser. No. 12/780,685, filed on May 14, 2010. Information generated by the NL query answering system in response to the query and displayed in the display 500 may assist a user in determining whether the query is a good candidate for using as a template for creating a widget. For example, if the answer 510 is not what the user intended or if the interpretation 512 by the NL query answering system is not what was intended by the user, the user may decide that the query in block 505 is not a good candidate. In this case, the user may enter a new query in the block 505 and press Enter, for example, to prompt the NL query answering system to respond to the new query.

When the user decides the query is appropriate for using as a template for creating a widget, the user may inform the widget generation application using a user interface mechanism 518, such as a button. For example, when the user activates the button 518, the widget generation application is informed that a widget is to be created using the query in block 505 as a template. An indication that a widget is to be created using the query may be transmitted by the device 102, 103 to the server 108 via the network 106.

In another embodiment, a new display separate from the display 500 of FIG. 5 is utilized to display information generated by the NL query answering system in response to the query and to prompt the user whether to use the NL query as a template for creating a widget.

When the user indicates that the query is to be utilized as a template, at block 410, the user is prompted to choose elements of the query that are to be variables in the widget. FIG. 7A is an illustration of an example display 530 that permits a user to select elements of a query that are to be variables in the widget. The display 530 may display the query 534 and may prompt a user to select elements in the query to be treated as variables. For example, in the display 530, the user is prompted to highlight an element or a term in the NL query that is to be a variable. In the illustration of FIG. 7A, the user highlighted the term "chicago". A term may be selected using a suitable user interface mechanism such as a mouse, a track ball, a touch screen, etc. When the user has selected a term, the user may activate a user interface mechanism 538, such as a button, to inform the widget generation application that an element of the query has been selected. For example, when the user activates the button 538, the widget generation application is informed that the highlighted term has been selected by the user. An indication of the selected term may be transmitted by the device 102, 103 to the server 108 via the network 106.

FIG. 7B is an illustration of the display 530 after the user highlighted the term "chicago" and activated the button 538. The display 530 shows the query 534 modified to reflect replacement of the term "chicago" with variable "input1". The display 530 also includes one or more user interface mechanisms 542 to specify how the variable input1 is to be processed by the widget and/or the NL query answering system. For example, a user interface mechanism 544a permits the user to change the variable name from the default name "input1". The variable names may be generated by the widget generation application and/or provided by the user. For example, in an embodiment, the widget generation application may generate default names such as "input 1" and "input 2", and the user can modify the variable names to provide more descriptive names, for example, using text boxes 544.

As discussed below, once the widget is generated, the widget will allow a user to specify a value of the variable using a user interface mechanism of the widget. In the display 530, a user interface mechanism 546a is provided to permit the user to specify a text label that the widget will display in association with the variable. A user interface mechanism 548a permits the user to specify a default value of variable. A user interface mechanism 550a permits a user to specify a type of user interface mechanism that the widget will provide to specify a value of the variable. The user interface mechanism 550a may be a pull-down menu or another suitable type of user interface mechanism. In an embodiment, the user interface mechanism 550a permits selecting from a group of graphical user interface mechanisms comprising an input field, a check box, a pop-up menu, and a radio button. In other embodiments, other suitable groups of graphical user interface mechanisms are provided such as two or more of an input field, a check box, a pop-up menu, a radio button, a slider, a button, etc.

A user interface mechanism 552a permits a user to specify a category to which the variable belongs. The category specifies to the NL query answering system how the variable should be interpreted. In an embodiment, the user interface mechanism 552a permits selecting from a group of categories comprising places, cities, countries, dates, quantities, mathematical elements, substances, financial stocks, and numbers. In other embodiments, other suitable groups of categories are provided such as two or more of places, cities, states/provinces, countries, dates, quantities, mathematical elements, substances, financial stocks, numbers, animals, foods, persons, etc. In the illustration of FIG. 7B, the user has selected "City" and the query 534 has been modified to specify that the variable "input1" is to be interpreted by the NL query answering system as a city. As will be explained below, in some embodiments, the widget, in operation, will insert a tag in queries sent by the widget to the NL query answering system to indicate to the NL query answering system that a particular element in the query should be interpreted as a city.

The NL query answering system is configured to analyze queries, and this analysis may be undertaken in a variety of ways in a variety of embodiments. In one embodiment, the terms of the natural language query may be identified and stored. Certain words may be eliminated such as "the" "a" and "an". In addition, the NL query answering system may understand plurals/singulars along with verb tenses, in some embodiments. Moreover, synonyms of natural language input terms may be used to better understand the query. Further, common misspellings may be noted and corrected. In some embodiments, the natural language terms may then be analyzed to determine if the inputted natural language terms match a previous natural language query. Still further, assumptions may be made when ambiguities arise. Additional information on how a natural language query input may be analyzed, in some embodiments, is found in U.S. patent application Ser. No. 11/852,044, filed on Sep. 7, 2007, U.S. patent application Ser. No. 12/780,685, filed on May 14, 2010, the entireties of which are hereby incorporated by reference.

As an example, a natural language query that contains the term "New York" may fit in the classification for a city. In addition, the term "New York" may fit into several classifications such as a state, a location, a book, a car and a type of steak. In some embodiments, the category is selected based on the context in which the term was used. As merely an example, if the term "New York" is included in a query that includes other city names, the term "New York" may be categorized as a city. On the other hand, if the term "New York" is included in a query that includes other state names, the term "New York" may be categorized as a state. As another example, if a number is included in the query, the number may be interpreted as a velocity with units of miles per hour if a term "mph" is next to the number. On the other hand, the number may be interpreted as a weight with units of pounds if a term "lb" is next to the number. U.S. patent application Ser. No. 11/852,044 and U.S. patent application Ser. No. 12/780, 685 discuss techniques for determining categories with which terms may be associated and that may be utilized in some embodiments.

In an embodiment, information regarding the analysis of the query by the NL query answering system is provided to the widget generation application, and the widget generation application uses the analysis information to select a default value for the interpretation (e.g., 552a). For example, if the NL query answering system categorizes the term "chicago" as a city, the widget generation application may utilize that information to select a default value of city in the pull down menu 552a. The user may then have the option of changing the categorization. In another embodiment, the widget generation application does not set a default value for selecting a category for a variable.

A user interface mechanism 556a, e.g., a button, etc., may be provided to permit the permit the user to deselect the term "chicago" in the original query as a variable.

FIG. 7C is an illustration of the display 530 after the user highlighted the term "los angeles" and activated the button 538. For example, when the user activates the button 538, the widget generation application is informed that the highlighted term has been selected by the user. An indication of the selected term may be transmitted by the device 102, 103 to the server 108 via the network 106.

The display 530 shows the query 534 modified to reflect replacement of the term "los angeles" with variable "input2". The display 530 also includes one or more user interface mechanisms 542 to specify how the variable input2 is to be processed by the widget and/or the NL query answering system. For example, user interface mechanisms 544b, 546b, 548b, 550b, 552b similar to user interface mechanisms 544a, 546a, 548a, 550a, 552a are provided. In the illustration of FIG. 7C, the user has selected "City" and the query 534 has been modified to specify that the variable "input2" is to be interpreted by the NL query answering system as a city. As discussed above, in an embodiment, information regarding the analysis of the query by the NL query answering system is provided to the widget generation application, and the widget generation application uses the analysis information to select a default value for the interpretation (e.g., 552b). For example, if the NL query answering system categorizes the term "los angeles" as a city, the widget generation application may utilize that information to select a default value of city in the pull down menu 552b. The user may then have the option of changing the categorization. In another embodiment, the widget generation application does not set a default value for selecting a category for a variable.

A user interface mechanism 556b, e.g., a button, etc., may be provided to permit the permit the user to deselect the term "los angeles" in the original query as a variable.

When the user is finished selecting and formatting variables, the user may activate a user interface mechanism 560, such as a button, to inform the widget generation application that selection of variables is completed. The user may utilize user interface mechanisms 560, 564, to navigate through display screens of the widget generation application, e.g., go back to revise previous selections or go forward to skip already completed steps. When the user activates the button 564, the widget generation application is informed that the user is done selecting terms in the query. An indication that the user is finished selecting terms may be transmitted by the device 102, 103 to the server 108 via the network 106.

Figure 8:
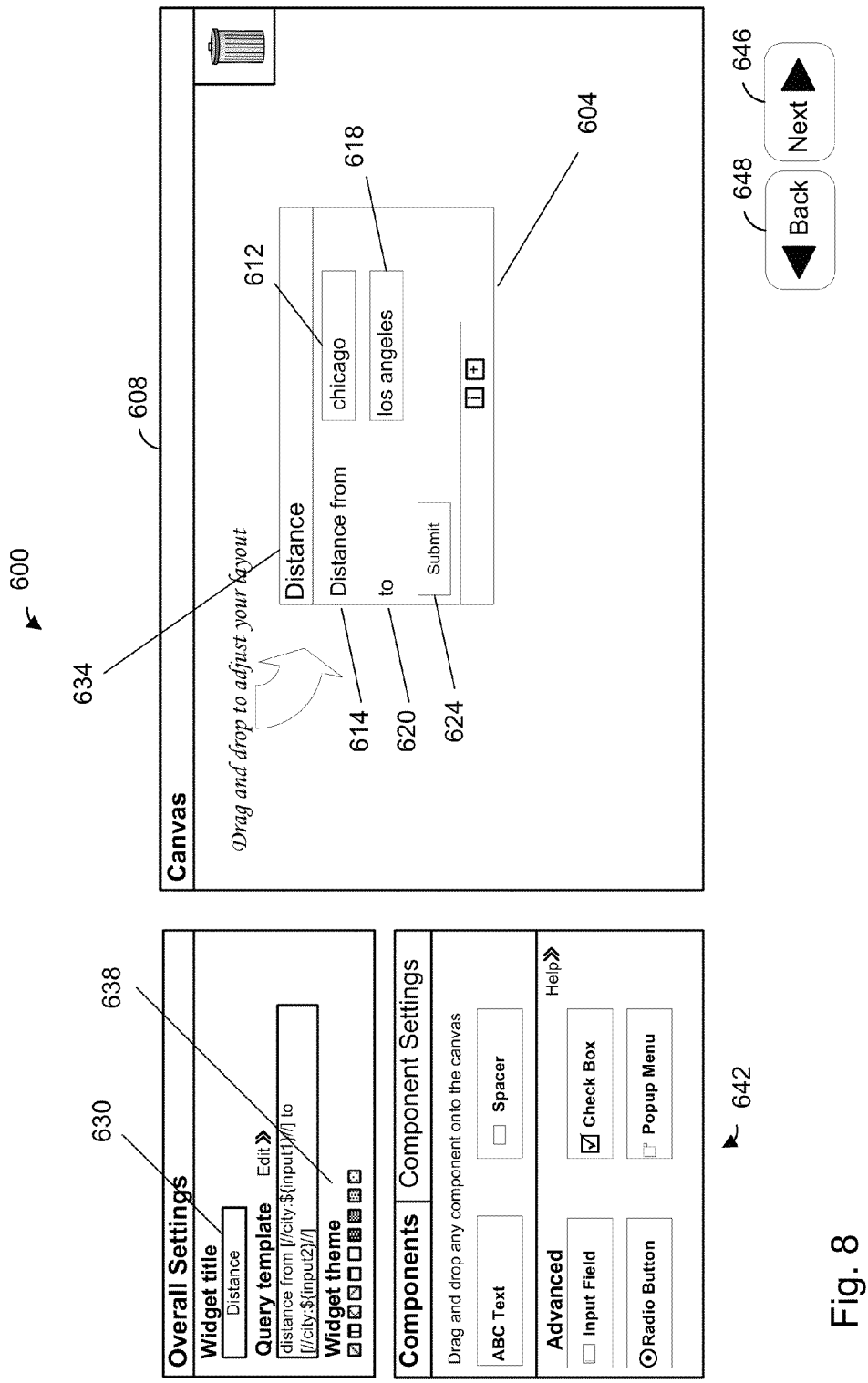
FIG. 8 is an illustration of a user interface for modifying a visual layout of a widget, according to an embodiment.

Referring again to FIG. 4, at block 415, a sample layout of a widget is generated and displayed to the user by the widget generation application. FIG. 8 is an illustration of a display 600 in which a sample layout of a widget is displayed. In particular, a sample layout 604 is displayed in a canvas area 608. An input field 612 is provided for entering a value of the variable input 1, and a label 614 is displayed next to the input field 612. An input field 618 is provided for entering a value of the variable input 2, and a label 620 is displayed next to the input field 618. A button 624 is provided for submitting a query generated by the widget to the NL query answering system, as will be described in more detail below. Referring to FIGS. 7C and FIG. 8, the user selected input fields for variables input 1 and input 2 using pull down menus 550, so the sample layout thus includes input fields 612 and 618. If the user had selected some other user input mechanism using the menus 550, such as a pull down menu, then the specified user input mechanisms would be displayed in the sample layout 604. The label 614 corresponds to the label selected by the user using the input field 546a, and the label 620 corresponds to the label selected by the user using the input field 546b.

Referring again to FIG. 4, at block 420, a user interface is provided to allow a user to modify the sample layout of the widget. Referring again to FIG. 8, the display 600 includes user interface mechanisms for modifying the sample layout 604. For example, the canvas area 608 may permit a user to modify positions and/or sizes of the fields 612, 618 via dragging and dropping, stretching, etc., using a mouse, a touch screen, etc. The canvas area 608 may permit a user to modify a position and/or size of the button 624 via dragging and dropping, stretching, etc., using a mouse, a touch screen, etc. The canvas area 608 may permit a user to modify positions of the labels 614, 620 via dragging and dropping, etc., using a mouse, a touch screen, etc. A user interface mechanism 630 may enable changing a title 634 of the widget. A user interface mechanism 638 may enable changing a color scheme of the widget. Other user interface mechanisms 642 may enable a user to make other changes, such as changes to the type of user interface mechanisms used in the widget 604 for supplying variable values, adding additional text labels, etc. When the user is finished modifying the layout, the user may activate a user interface mechanism 646, e.g., a button. If the user wishes to go back to the display 530 of FIGS. 7A-7C, the user may activate a user interface mechanism 648, e.g., a button.

The widget generation application is informed of the modifications made by the user. For example, indications of the modifications made by the user may be transmitted by the device 102, 103 to the server 108 via the network 106.

Referring again to FIG. 4, at block 425, information regarding the layout generated at block 415 and changes made by the user at block 420, if any, are stored.

At block 430, a user interface is provided to permit the user to select which information generated by the NL query answering system will be displayed as output by the widget. FIG. 9 is an illustration of a display 660 that may be utilized by the widget generation application to permit a user to select which information generated by the NL query answering system will be displayed as output by the widget. For instance, the display 660 includes user interface mechanisms 664, 668, 672 to permit a user to select which information generated by the NL query answering system will be displayed as output by the widget. In embodiments in which the NL query answering system is configured to make assumptions when analyzing NL queries and to output information regarding the assumptions made when generating an answer, the button 664 may permit a user to select whether the output displayed by the widget will show the information regarding the assumptions made. Similarly, in embodiments in which the NL query answering system is configured to warning information regarding potential errors in connection with the analysis of the query or the answer, the button 668 may permit a user to select whether the output displayed by the widget will show the warning information.

In embodiments in which the NL query answering system is configured to generate and output information related to the answer, the user interface 672 may permit a user to select which information generated by the NL query answering system is to be included in the output of the widget.

The widget generation application is informed of the selections made by the user. For example, indications of the selections made by the user may be transmitted by the device 102, 103 to the server 108 via the network 106.

Referring again to FIG. 4, at block 435, a user interface is provided to permit the user to select a format of the widget. FIG. 10 is an illustration of an example display 700 for permitting the user to select a format of the widget. The display includes a preview area 704 that displays how the widget will look. The display 700 also includes a user interface 708 that permits a user to select the format of the output of the widget. For example, in an example embodiment, a user may select whether the output is displayed in an area that appears on top of a web page that includes the widget and where the web page is darkened to highlight the widget output that appears on top. Also, in an embodiment, a user may select whether the output is displayed in a new web browser window. Also, in an embodiment, a user may select whether the output is displayed inline in the web page in which the widget is included. For example, the user may select an output format using a button 712 or other suitable user interface mechanism. The user may be permitted to preview how the different output formats will look in the preview area 704 by selecting one of the buttons 712 and activating the button 716, for example. A user interface 720 may permit a user to adjust a screen size of the widget.

The widget generation application is informed of the selections made by the user. For example, indications of the selections made by the user may be transmitted by the device 102, 103 to the server 108 via the network 106.

Referring again to FIG. 4, at block 440, code for implementing the widget may be generated. The generated code may be any suitable type of code such as code in a scripting language, e.g., JavaScript. The code may be downloaded to a user device, presented on a web page so that the code can be copied and pasted by the user, etc., so that a user can obtain the code and then insert the code into a web page, for example. Additionally, a web page may be automatically generated that includes the code so that the widget can be accessed via a URL of the automatically generated web page, for example. The widget is generated according to the selections and modifications made by the user as described above with respect to FIGS. 4-10.

Figure 11:
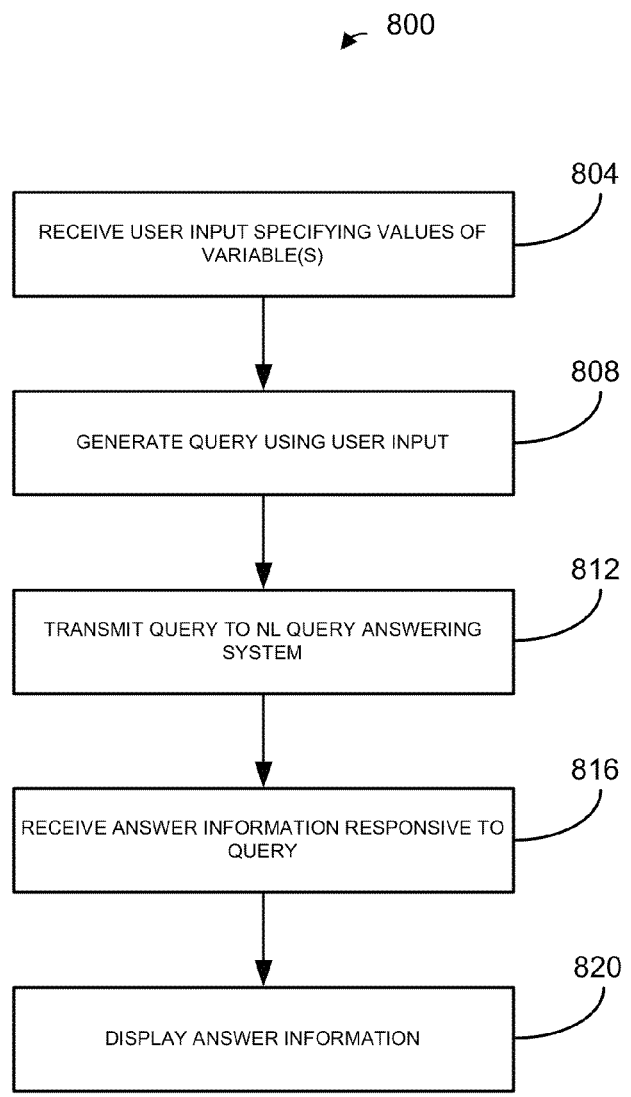
FIG. 11 is a flow diagram of an example method of operation of a widget, according to an embodiment.

In an embodiment, the code generated at block 440, when executed by a processor (such as the controller 111 of FIG. 2 or the controller 144 of FIG. 3), causes the processor to execute the method 800 of FIG. 11. The method 800 will be described with reference to the example displays of FIGS. 7A-10 for ease of explanation, although the example displays of FIGS. 7A-10 are not utilized with the method 800. The code generated at block 440, i.e., the widget, may generate displays such as web pages, windows, etc., to prompt a user to enter information, make selections, display answer information, etc. In a client/server embodiment, the displays generated by the widget may be transmitted by the server to a client device via a network such as the network 106 (see FIG. 1).

At block 804, user input is received via user interface mechanisms of the widget. For example, as discussed above, when creating the widget, the user can specify user interface mechanisms using input blocks 550 of the example display 530. In the example display 530, the user chose for the widget to except input via input text fields. For example, as seen in FIG. 8, a widget accepts user input in input text fields 612, 618. In other examples, the user interface mechanisms of the widget may include one or more of a pop-up menu, one or more buttons, a slider, etc.

The user input received at block 804 corresponds to variables of a query as discussed above with respect to FIGS. 7A-7C. In particular, the user input received at block 804 corresponds to specified values of the variables.

In some client/server embodiments, the user input may be transmitted by the client device to the server via the network. For example, with the example widget illustrated in FIG. 8, when the user selects the button 624, the text entered in the input fields 612, 618 is transmitted to the server. In other client/server embodiments, the user input need not be transmitted by the client device to the server via the network.

At block 808, the widget generates a query using the input received at block 804. The query is based on an NL query (used to create the widget as discussed above). The query is generated to include the values, received at block 804, of one or more variables.

The query generated by a widget corresponding to the example display 530 of FIG. 7C may correspond to "distance from [//city:${input1}//] to [//city:${input2}//]", where input1 is replaced with a first user input received at block 804 and input2 is replaced with a second user input received at block 804. For example, if the user input "kansas city" as the first user input and "dallas" as the second user input, the query would be generated to replace input1 with "kansas city" and input2 with "dallas". In an embodiment, the query is generated to include keywords to specify categories of the values input by the user. In the example query described above, the keyword "city" is associated with the user inputs to indicate that the values provided by the user should be interpreted by the NL query answering system as cities.

In an embodiment, the NL query answering system is able to recognize words and phrases that are stored in an entities database. For example, the entities database may comprise a structured database storing entities organized into categories, sub-categories, etc. In some embodiments, an entity can belong to multiple categories, sub-categories, etc. For example, a hamburger could be categorized as "Food" and also categorized as "Fast Food", which is a sub-category of Food.

The NL query answering system may recognize certain keywords that indicate how the NL query answering system should interpret a term. As an example, the word "pi" can refer to different things, like the name of the well-known mathematical constant (π) or the name of the movie "pi". If the word "pi" is to be interpreted as the mathematical constant, a keyword such as "NamedConstant" or some other suitable keyword may be utilized. On the other hand, if the word "pi" is to be interpreted as the movie, a keyword such as "Movie" or some other suitable keyword may be utilized.

The keyword for a word, a phrase, a group of textual characters, etc., is associated with the word, the phrase, the group of textual characters, etc., so that the NL query answering system can determine to which word, phrase, group of textual characters, etc., the assumption applies. The indication is associated with the word, the phrase, the group of textual characters, etc., using a precise syntax known to the NL query answering system. For example, for the query "distance from [//city:kansas city//] to [//city:dallas//]", the brackets and slashes indicate to the NL query answering system that the term "kansas city" should be interpreted as a "city" and the term "dallas" should be interpreted as a "city".

As another example, the letter "m", standing alone or in combination with other characters such as "/" may refer to units of meters or minutes. If "m" is referring to units of meters, keywords such as "Unit" and "Meters" or some other suitable keywords may be utilized. The keywords "Unit" and "Meters" may be associated to indicate that "Meters" is a subtype of "Units". If "m" is referring to units of minutes, keywords such as "Unit" and "Minutes" or some other suitable keywords may be utilized. The keywords "Unit" and "Minutes" may be associated to indicate that "Minutes" is a subtype of "Units".

In another embodiment, the generated query does not include keywords to specify categories of the values input by the user.

In some client/server embodiments, the client may generate the query. In other client/server embodiments, the server may generate the query.

At block 812, the query generated at block 808 is transmitted to the NL query answering system. In some client/server embodiments, the client may transmit the query to the NL query answering system via a network. In other client/server embodiments, the server may transmit the query via a network. At block 816, answer information generated by the NL query answering system in response to the query is received. In some client/server embodiments, the NL query answering system may transmit the answer information to the server via a network. In other client/server embodiments, the NL query answering system may transmit the answer information to the client via a network.

At block 820, at least some of the answer information received at block 816 is displayed by the widget. The information displayed may be the information selected by the user to be displayed using the user interface mechanisms 664, 668, 672 of FIG. 9, for example. The format of the display of the output (e.g., light box, pop-up, in-line) may be according to the selection by the user using the user interfaces 708, 720 of FIG. 10, for example. In some client/server embodiments, answer information is received from the NL query answering system by the client. In other client/server embodiments, answer information is received from the NL query answering system by the server, and the server then transmits answer information to the client via the network. For example, the server may generate a web page that includes the answer information and transmit the web page to the client.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, method blocks described above may be implemented using a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict widget generation system for purposes of illustration only. One skilled in the art will readily recognize from the above discussion that alternative embodiments of the structures, methods, and displays illustrated herein may be employed without departing from the principles described herein Upon reading this disclosure, those of ordinary skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for creating a user interface application, the method comprising:
   prompting in an NL query interface, using one or more computing devices, a first user to submit an NL query;
   receiving the NL query via the NL query interface, the NL query having first query parameters;
   generating, using one or more computing devices, the user interface application according to the NL query, wherein the user interface application is operable separately from the NL query interface and is configured to:
      prompt the first user or a second user to provide second query parameters via the user interface application, the second query parameters specifying a second query related to the NL query, and the second query parameters different than the first query parameters,
      receive the second query parameters via the user interface application,
      generate a computer-generated query based on the NL query and the received second query parameters,
      provide the computer-generated query to the NL query answering system,
      receive answer information from the NL query answering system in response to the computer-generated query, and
      cause a display device to display a portion of the answer information.

2. The method of claim 1, further comprising prompting, using one or more computing devices, the first user to select one or more terms in the NL query as one or more variables;
   wherein the user interface application is generated so that the user interface application is configured to
      determine respective one or more values of the one or more variables using the received second query parameters, and
      generate the computer-generated query to include the respective one or more values of the one or more variables.

3. The method of claim 2, further comprising prompting, using one or more computing devices, the first user to select respective one or more categories for the one or more variables;
   wherein the user interface application is generated so that the user interface application is configured to generate the computer-generated query to include respective one or more keywords associated with the respective one or more values of the one or more variables; and
   wherein the respective one or more keywords are recognizable by the NL query answering system as indicating how the NL query answering system should interpret the one or more values of the one or more variables.

4. The method of claim 1, further comprising prompting, using one or more computing devices, the first user to select one or more types of answer information to be displayed by the user interface application;
   wherein the user interface application is generated so that the user interface application is configured to
      determine the portion of the answer information to be displayed, from the answer information received in response to the computer-generated query, according to the one or more types of answer information selected by the first user, and
      cause the selected types of the answer information received in response to the computer-generated query to be displayed on the display device.

5. The method of claim 4, wherein the answer information received in response to the computer-generated query is second answer information, the method further comprising:
   providing the NL query to the NL query answering system;
   receiving first answer information in response to the NL query; and
   using the first answer information received in response to the NL query to prompt the first user to select one or more types of answer information for display by the user interface application.

6. The method of claim 1, further comprising:
   providing the NL query to the NL query answering system;
   receiving answer information in response to the NL query; and
   causing the answer information received in response to the NL query to be displayed to the first user.

7. The method of claim 1, further comprising:
   generating, using one or more computing devices, a sample display layout for the user interface application;
   prompting, using one or more computing devices, the first user to modify the sample display layout;
   wherein the user interface application is generated so that the user interface application is configured to have a display layout that corresponds to the sample display layout modified according to modifications from the first user, if any.

8. A system comprising one or more computing devices configured to:
   prompt, via an NL query interface, a first user to submit a natural language (NL) query;
   receive the NL query via the NL query interface, the NL query having first query parameters;
   generate a user interface application according to the NL query, wherein the user interface application is operable separately from the NL query interface and is configured to
      prompt the first user or a second user to provide second query parameters via the generated user interface application, the second query parameters specifying a second query related to the NL query, and the second query parameters different than the first query parameters,
      receive the second query parameters via the generated user interface application,
      generate a computer-generated query based on the NL query and the received second query parameters,
      provide the computer-generated query to an NL query answering system, receive answer information from the NL query answering system in response to the computer-generated query, and cause a display device to display a portion of the answer information.

9. The system of claim 8, wherein the one or more computing devices are configured to prompt the first user to select one or more terms in the NL query as one or more variables;

wherein the user interface application is generated so that the user interface application is configured to determine respective one or more values of the one or more variables using the received second query parameters, and generate the computer-generated query to include the respective one or more values of the one or more variables.

10. The system of claim 9, wherein the one or more computing devices are configured to prompt the first user to select respective one or more categories for the one or more variables;

wherein the user interface application is generated so that the user interface application is configured to generate the computer-generated query to include respective one or more keywords associated with the respective one or more values of the one or more variables; and wherein the respective one or more keywords are recognizable by the NL query answering system as indicating how the NL query answering system should interpret the one or more values of the one or more variables.

11. The system of claim 8, wherein the one or more computing devices are configured to prompt the first user to select one or more types of answer information to be displayed by the user interface application;

wherein the user interface application is generated so that the user interface application is configured to determine the portion of the answer information that will be displayed on the display device, from the answer information received in response to the computer-generated query, according to the one or more types of answer information selected by the first use, and cause the display device to display the selected types of the answer information received in response to the computer-generated query.

12. The system of claim 11, wherein the one or more computing devices are configured to:

provide the NL query to the NL query answering system;

receive answer information in response to the NL query; and use the answer information received in response to the NL query to prompt the first user to select one or more types of answer information to be displayed by the user interface application.

13. The system of claim 8, wherein the one or more computing devices are configured to:

provide the NL query to the NL query answering system;

receive answer information in response to the NL query; and cause the answer information received in response to the NL query to be displayed to the first user.

14. The system of claim 8, wherein the one or more computing devices are configured to:

generate a sample display layout for the user interface application;

prompt the first user to modify the sample display layout;

wherein the user interface application is generated so that the user interface application is configured to have a display layout that corresponds to the sample display layout modified according to modifications from the first user, if any.

15. A method for retrieving answer information from a natural language (NL) query answering system, the method comprising:

prompting, in a user interface application generated according to an NL query having first query parameters, using one or more computing devices, a user to provide second query parameters regarding a second query, the second query related to the NL query, and the second query parameters different than the first query parameters;

determining one or more respective values of one or more variables using the received second query parameters; and generating a computer-generated query that is based on the NL query, wherein the computer-generated query is generated to include the one or more respective values of the one or more variables;

providing the computer-generated query to the NL query answering system;

receiving, from the NL query answering system, answer information responsive to the computer-generated query; and causing a display device to display the answer information.

16. The method of claim 15, wherein the computer-generated query is generated to include respective one or more keywords associated with the respective one or more values of the one or more variables; and wherein the respective one or more keywords are recognizable by the NL query answering system as indicating how the NL query answering system should interpret the one or more values of the one or more variables.

17. The method of claim 15, further comprising:

determining types of the answer information that will be displayed in response to receiving the answer information from the NL query answering system, and causing the display device to display the determined types of the answer information received.

18. A system for retrieving answer information from a natural language (NL) query answering system, the system comprising one or more computing devices configured to:

prompt a user to provide, via a user interface application generated according to an NL query having first query parameters, second query parameters regarding a second query, the second query related to the NL query, and the second query parameters different than the first query parameters;

determine one or more respective values of one or more variables using the received second query parameters;

generate a computer-generated query that is based on the NL query, wherein the computer-generated query is generated to include the one or more respective values of the one or more variables;

provide the computer-generated query to the NL query answering system;

receive, from the NL query answering system, answer information responsive to the computer-generated query; and cause the answer information to be displayed on a display device.

19. The system of claim 18, wherein the computer-generated query is generated to include respective one or more keywords associated with the respective one or more values of the one or more variables; and wherein the respective one or more keywords are recognizable by the NL query answering system as indicating how the NL query answering system should interpret the one or more values of the one or more variables.

20. The system of claim 18, wherein the one or more computing devices are configured to:
 determine which types of answer information received in response to the computer-generated query should be displayed; and
 cause the selected types of the answer information received in response to the computer-generated query to be displayed on the display device.

21. A computer-readable medium storing instructions, the instructions when executed by one or more processors cause the one or more processors to:
 prompt, in an NL query interface, using one or more computing devices, a first user to submit a natural language (NL) query;
 receive the NL query via the NL query interface, the NL query having first query parameters;
 generate, using one or more computing devices, a user interface application according to the NL query, wherein the user interface application is operable separately from the NL query interface and is configured to:
  prompt the first user or a second user to provide second query parameters via the generated user interface application, the second query parameters specifying a second query related to the NL query, and the second query parameters different than the first query parameters,
  receive the second query parameters via the generated user interface application,
  generate a computer-generated query based on the NL query and the received second query parameters,
  provide the computer-generated query to an NL query answering system,
  receive answer information from the NL query answering system in response to the computer-generated query, and
  cause a display device to display a portion of the answer information.

22. A computer-readable medium storing instructions, the instructions when executed by one or more processors cause the one or more processors to:
 prompt, in a user interface application generated according to an NL query having first query parameters, using one or more computing devices, a user to provide second query parameters regarding a second query, the second query related to the NL query, and the second query parameters different than the first query parameters;
 determine one or more respective values of one or more variables using the received second query parameters; and
 generate a computer-generated query that is based on the NL query, wherein the computer-generated query is generated to include the one or more respective values of the one or more variables;
 provide the computer-generated query to a NL query answering system;
 receive, from the NL query answering system, answer information responsive to the computer-generated query; and
 cause a display device to display the answer information.

* * * * *